ANODIC PASSIVATING PROCESSES FOR INTEGRATED CIRCUITS

Filed May 3, 1972 6 Sheets-Sheet 1

ANODIC PASSIVATING PROCESSES FOR INTEGRATED CIRCUITS

Filed May 3, 1972

March 19, 1974 R. C. BRACKEN ET AL 3,798,135

ANODIC PASSIVATING PROCESSES FOR INTEGRATED CIRCUITS

Filed May 3, 1972 6 Sheets-Sheet 6

United States Patent Office 3,798,135
Patented Mar. 19, 1974

3,798,135

ANODIC PASSIVATING PROCESSES FOR INTEGRATED CIRCUITS

Ronald C. Bracken, James G. Harper, and Arnold D. Paddock, Dallas, and Wilson G. Morrison, Houston, Tex., assignors to Texas Instruments Incorporated, Dallas, Tex.

Filed May 3, 1972, Ser. No. 249,807
Int. Cl. C23b *5/48;* H01l *11/00*
U.S. Cl. 204—15 12 Claims

ABSTRACT OF THE DISCLOSURE

Anodic oxidation is employed in the fabrication of integrated circuits to provide passivation and protection from abrasion. In one aspect of the invention the anodized passivating layer is selectively etched to expose bonding pads and scribe line areas. In a different aspect of the invention, a method for fabricating a multilevel interconnected integrated circuit is provided wherein a layer of anodic oxide is formed to cover the first level of interconnects. A layer of insulating material is then deposited over the anodic oxide layer to advantageously reduce interlevel capacitance. First level bonding pads and scribe line areas are exposed. A conductive layer is then deposited and patterned to form the second level interconnect pattern. This second level interconnect may also be protected by an anodic oxidation overlayer, if desired.

The present invention pertains to integrated circuits in general and more particularly to improved methods for fabricating such circuits wherein an anodic oxide overlayer is employed to provide protection for the interconnect patterns and semiconductor material.

In the semiconductor industry a large number of integrated circuits are typically formed on a single slice of semiconductor material. The discrete integrated semiconductor circuits are processed simultaneously and are subsequently separated along scribe lines into individual chips or wafers, each wafer containing one or more integrated circuits. A commonly utilized method for forming ohmic contacts and electrical leads to the integrated circuits involves the deposition of aluminum metal, followed by selective etching to remove undesirable portions of the aluminum film. This method for forming the interconnect pattern generally begins with a silicon slice in which all of the impurity diffusions have been completed, a passivating layer of silicon oxide typically remaining on the silicon surface. By the use of standard photolithographic techniques, the oxide layer is selectively etched to provide windows therein which expose the silicon surface at locations where ohmic contacts are to be formed. The slice is then cleaned and placed in a vacuum evaporating apparatus, typically a bell jar. A source of aluminum metal is coiled around a tungsten filament within the bell jar and a sufficient voltage is applied to the filament for the purpose of melting and vaporizing the aluminum. A thin film of aluminum metal is thereby deposited on the entire surface of the slice. The bell jar is then back-filled and the slice with the overlying aluminum layer is removed. The aluminum is then masked with a patterned photoresist film. The composite is immersed in a sodium hydroxide solution, as a selective etch, to remove the unmasked portions of the aluminum film and thereby provide the desired pattern of ohmic contact electrical leads. The slice is then usually baked at a temperature slightly above the silicon-aluminum eutectic in order to obtain a shallow alloy layer to improve the reliability of the ohmic contact. As a final step, the wafers are separated along scribe lines in the surface of the slice.

A major problem associated with processing the wafers relates to the fact that the interconnect pattern is very easily damaged and a large number of wafers are ruined, even though great care is exercised in handling them. This problem is more acute in multilevel integrated circuits because the metallization pattern itself is slightly raised above the level of the surrounding exterior surface of the structure. When a second level metallization is applied, the crossover points produce an even more exaggerated irregularity is the surface layer, increasing the damage by accidental abrasion or scratching.

Passivating layers of silicon oxide have been utilized in the art, but this method of passivating an integrated circuit structure has the attendant disadvantage of relatively high temperature processing, which often produces degradation in the device. For example, at higher temperatures the aluminum may alloy with silicon and cause shorting. It has also been proposed to convert part of the metal pattern to an oxide, but this consumes part of the leads and may result in open-circuits.

In certain situations however, it may be advantageous to form the interconnect pattern of the integrated circuit by an anodic oxidation process wherein "inlaid" metallization geometry is provided without the requirement of selectively etching a metal layer. Such a technique and its structure are described in more detail in copending application, Ser. No. 843,642 filed July 22, 1969 of Williams R. McMahon and Thomas H. Ramsey (since issued as U.S. Pat. No. 3,634,203), assigned to the assignee of the present invention and hereby incorporated by reference.

In many applications it may be desirable to form a multilevel interconnect structure. In such structures, interlevel capacitance is often a problem, and techniques for reducing such capacitance are required. Also, it may be advantageous to form the first layer of a multi-level interconnect utilizing the above referenced selective anodic oxidation method, in combination with a subsequent metallization layer provided by conventional masking and etching techniques. In accordance with the present invention it is advantageous to provide an anodic oxidation passivating layer over the etched pattern.

Accordingly an object of the present invention is to provide an improved method for fabricating an integrated circuit having a passivating protective layer.

An additional object of the invention is to provide a method for fabricating an integrated circuit having an anodic oxidized passivating layer.

Yet another object of the invention is to provide a method for fabricating integrated circuits having an anodic oxide layer wherein via holes are etched to expose contact pads.

A further object of the invention is to provide an improved method for fabricating a multilevel integrated circuit having minimal interlevel capacitance.

Still another object of the invention is to provide an improved method of fabricating a multilevel circuit having an anodic oxide protective layer over the first layer and a deposited insulating layer over the anodic oxide to minimize interlevel capacitance.

An additional object of the invention is to provide an improved method for exposing, through an anodic oxide layer, the content pads and scribe lines during fabrication of integrated circuits.

Briefly in accordance with the present invention a process is disclosed for fabricating a semiconductor integrated circuit wherein conductive contacts of an interconnect pattern extend through apertures in an insulating layer to contact selected regions on the surface of a semiconductor body. The method provides an improved technique for protecting the exposed surface of the contacts and interconnect pattern. One aspect of the invention is embodied in a method beginning with the step of depositing a metal film of the desired thickness on the semiconductor substrate and interconnect pattern thereon. The substrate and metal film are then immersed in a suitable electrolytic bath with the metal layer connected as the anode of an electrochemical oxidation cell. Upon the application of a DC voltage, oxidation of the metal film begins. The oxidation front deepens uniformly at a rate substantially proportional to the current flow until the complete thickness of the metal film is converted to the oxide. The converted insulator film, i.e., anodic oxide layer, is then masked to expose regions of anodic oxide insulator overlying selected contact pads of the interconnect pattern. These exposed regions are then etched with a suitable etchant to expose the contact pads for external connection.

This method is advantageous in that conventional integrated circuit fabrication techniques utilizing photolithographic masking and etching may be utilized to define the integrated circuit and interconnect pattern. The metal layer is then evaporated over the integrated circuit and interconnect pattern and is anodized to completion before any further processing steps are performed. Preferably aluminum is utilized as the metal, enabling a relatively inexpensive aluminum evaporating system to be substituted for the more expensive quartz system which is conventionally utilized. A further advantage is that the passivating layer is formed on a slice free of photoresist which results in cleaner evaporation producing increased yields. That is, when the protecting layer is conventional silicon dioxide, a photoresist pattern is formed over regions where via holes are required. The photoresist patterning leaves a scum on the surface of the slice. Subsequently, when the silicon oxide is deposited, the scum prevents proper adhesion etc., reducing the yield. In the present invention, however, the aluminum is deposited on a clean surface since a photoresist pattern is not required prior to depositing the aluminum. Further, when aluminum is utilized for the anodic oxidation layer the evaporation may be done at room temperatures as compared to elevated temperatures as required for silicon oxide deposition. This further improves the yield of the integrated circuits since it reduces the possibility of aluminum alloying with silicon and forming "shorts."

A method of the invention is characterized more particularly relative to the fabrication of an integrated circuit structure having an anodized insulating layer for protecting the metallization pattern. In this aspect of the invention an insulating film is formed on a surface of a semiconductor substrate. Windows are opened in the insulator film where ohmic contact is desired to the substrate. A metal film is then deposited over the insulator film extending through the windows into ohmic contact with the semiconductor substrate. The metal film is patterned to define the desired interconnect pattern and associated expanded contact regions. A second metal film is deposited over the resulting structure. The second metal film is electrolytically converted to a protective insulating layer. The electrolytically converted layer is then masked to expose regions of the insulator which overlie the contact pads of the metallization pattern. The exposed regions are then etched so that external contact to the metallization pattern may be effected. The remaining portion of the metallization pattern however is protected from abrasion by the electrolytically converted metal film.

In the previously mentioned copending application an "inlaid" metallization pattern is disclosed wherein a relatively thick metal layer is selectively anodized to provide the "inlaid" pattern. In regions where no conductor is required the layer is anodized to completion. In such a structure it has been discovered that the grain size of the aluminum—where relatively thick layers are formed, such as, e.g., 50 microinches or more in thickness—is relatively large and during anodization may not be completely converted to oxide, leaving "pockets" of metal which may inadvertently result in "shorts." In the present invention, however, the metal layer to be anodized in order to form the protective layer may be relatively thin—less, e.g., than 30–35 microinches. For this thickness, the grain size is relatively small and readily completely converts to an oxide during anodization, eliminating residual metal pockets experienced in larger grain size metal. This, of course, advantageously increases the yield.

The present invention may also advantageously be utilized to fabricate a multilevel integrated circuit. In this aspect of the invention a first level conductive interconnect pattern is defined on a semiconductor substrate to extend through apertures in an insulating layer over the surface of the substrate so that the metallization pattern selectively ohmically contacts different regions of the surface of the semiconductor substrate. The first level interconnect pattern defines expanded contacts where ohmic connection to a second level of metallization is required. The expanded contact regions are then masked with an organic polymer, and a second conductive film is deposited on the resulting composite. The second conductive film is then electrically converted to an insulator. Next a second insulating layer is deposited over the electrolytically converted layer to a suitable thickness to advantageously minimize inter-layer capacitance. The resulting structure is then heated to a temperature sufficient to expand the organic polymer to "pop" via openings through the deposited insulator layer and the electrolytically converted insulator layer to thereby expose the expanded contacts for external connection. A third conductive layer is then deposited to extend through the via openings and ohmically contact the expanded contacts and the third conductive layer is patterned to define a predetermined second level interconnect pattern. During this etching step the deposited insulator protects the electrolytically converted layer from the corrosive action of the etchant.

An additional embodiment of the invention is characterized as a method for forming a plurality of integrated circuits having multi-level interconnects. In this aspect of the invention a plurality of circuit elements are formed to extend from one surface of a semiconductor substrate. These circuit elements respectivly correspond to the elements of respective integrated circuits. Next an insulating layer is deposited over the surface of the substrate and a plurality of apertures are opened through this insulating layer to expose the circuit elements and the scribe lines which separate the respective integrated circuits. A conductive layer is then deposited over the insulating layer to extend through the apertures and ohmically contact the circuit elements. This conductive layer is patterned to define a predetermined conductive interconnect pattern having expanded contact regions at locations where connections with a second level interconnect pattern is required. Next the expanded contact regions of the first level interconnect pattern and the scribe line regions separating the respective integrated circuits are masked with an organic polymer and a second conductive film is deposited over the composite. This second conductive film is electrolytically converted to an insulator, followed by deposition of a second layer of insulating material over the electrolytically converted layer. Next the structure is heated to a temperature sufficient to expand the organic polymer to "pop" via openings through the insulating layers to expose the expanded contacts and scribe lines. Another conductive layer is deposited to extend through the via openings and ohmically contact the expanded contacts. This conductive layer is patterned to define a predetermined second level interconnect pattern. Preferably this pattern is accomplished by etching with a suitable etchant such that the deposited insulating layer protects the electrolytically converted layer from corrosive action of the etchant. As a final step the wafers are separated along the scribe lines in the surface of the slice. This method advantageously produces a multilevel interconnect system having compatible first and second level processing and produces a structure wherein the two levels of interconnect are electrically insulated from each other and where the interlevel capacitance is minimal.

In a different aspect of the invention, a method is provided for simultaneously processing a plurality of integrated circuits on a single slice. Here, circuit elements are formed over an insulating layer and extend through apertures therein to ohmically contact the semiconductor material. This is effected by conventional fabrication techniques. Next bonding pads and scribe lines are masked. This may be accomplished using photomasks employed in the conventional silicon oxide process. The photoresist is hard baked, about 170° C. for thirty minutes using conventional photoresist, and a metal layer, of e.g., aluminum is evaporated over the slice to a thickness of about 2.5 to 5.0 kA. The structure is placed in a suitable electrolytic bath and the metal layer anodized to completion. The structure is then heated to a temperature sufficient to expand or vaporize the photoresist, thereby to "pop off" the overlying anodized oxide in those areas. This provides via holes to the bonding pads and also frees the scribe lines so that the wafers may be easily separated. This method is advantageous in that it protects the metallization from humidity and abrasion, is compatible with existing quartz processes, and requires no etching to effect external contact. Also, since the scribe line regions are free from oxide, wafer separation is less difficult, resulting in increased yield.

Other objects and advantages of the invention will be apparent upon reading the following detailed description of illustrative embodiments of the invention in conjunction with the drawings wherein:

FIGS. 1*a* through 1*g* are cross sectional views of a substrate illustrating a sequence of steps for providing a metallization pattern protected by a passivating layer;

FIGS. 2*a* through 2*g* are cross sectional views of a substrate illustrating a sequence of steps for providing a multilevel interconnect system having an uppermost metallization pattern protected by a passivating layer; layer;

Figure 6A:
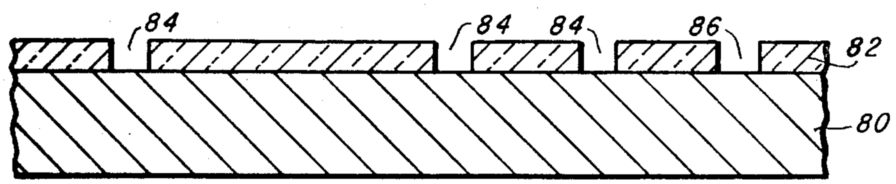
Figure 6B:
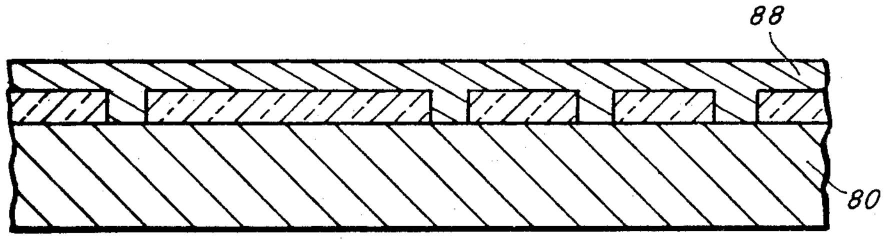
Figure 6C:
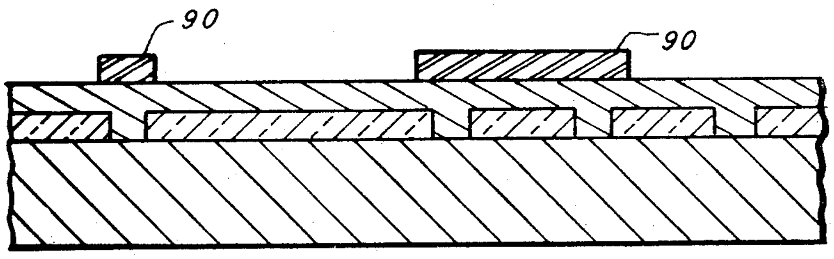
Figure 6D:
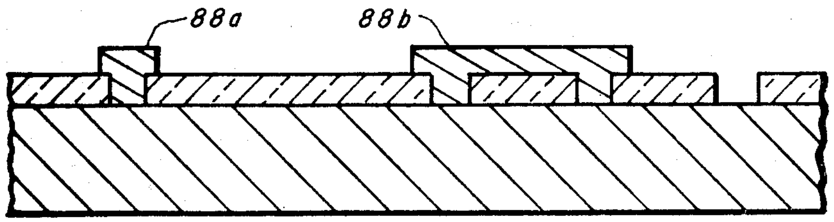
Figure 6E:
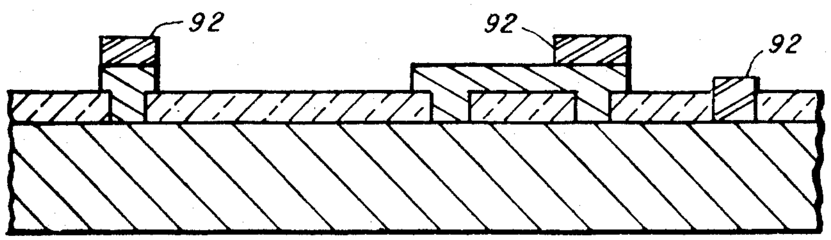
Figure 6F:
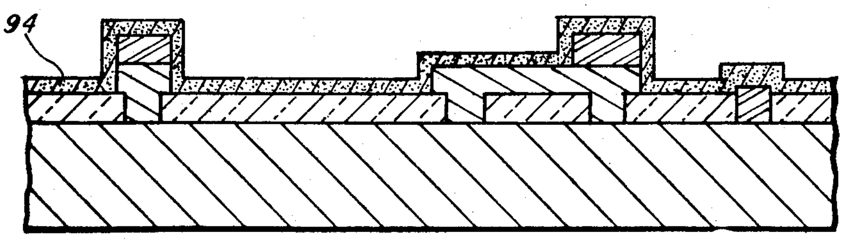
Figure 6G:
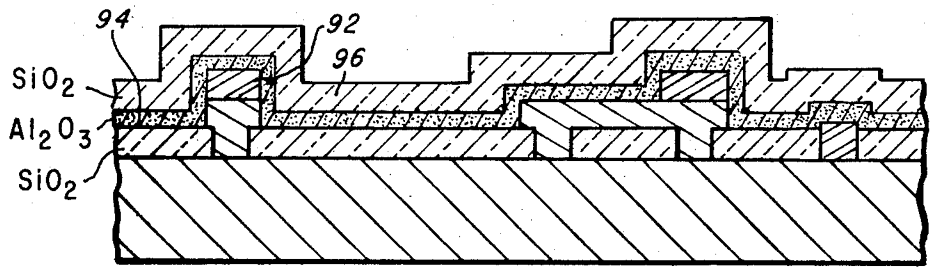
Figure 6H:
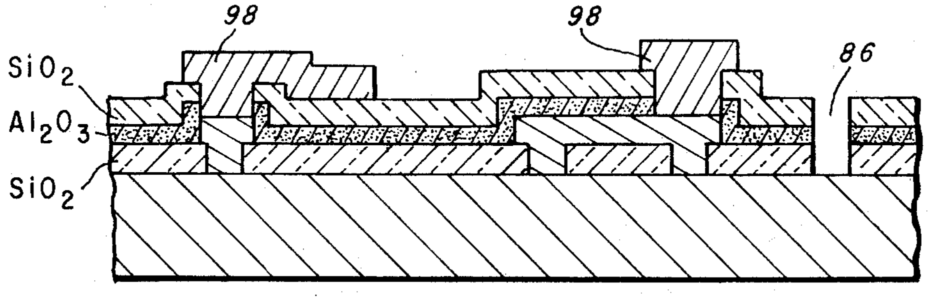
Figure 7:
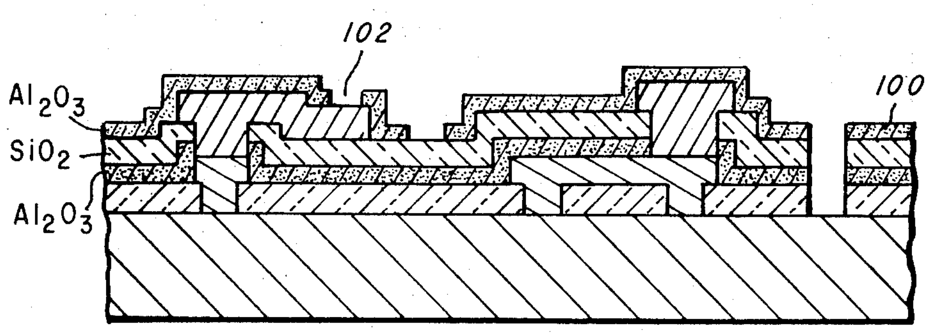

FIGS. 6*a* through 6*h* are cross sectional views of a substrate illustrating fabrication of a multilevel metallization system having a minimum inter-level capacitance; and FIG. 7 is a cross sectional view of a multilevel integrated circuit having minimal capacitance where the exposed metallization pattern is protected by a passivating layer.

Figure 1A:
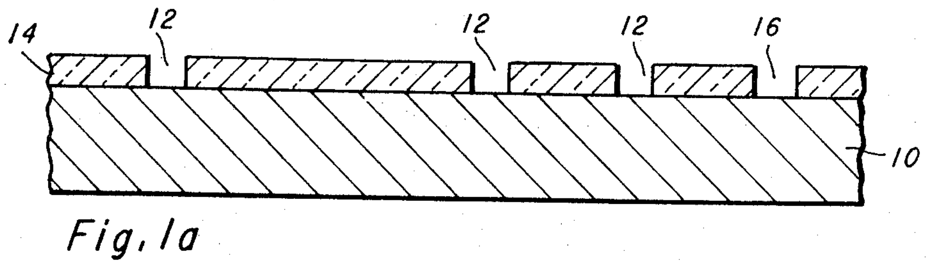

With reference to FIG. 1*a* a semiconductor substrate is illustrated at 10. Preferably the substrate 10 comprises a single crystalline silicon slice in which there are a plurality of semiconductor regions of varying conductivity type and varying impurity concentration to define various circuit elements of an integrated circuit. Only a portion of the slice is illustrated; typically the slice would contain dozens of integrated circuits. The circuit elements may be formed in the substrate surface itself or in an overlying epitaxially grown layer. For clarity of illustration the respective circuit elements of the integrated circuits are not illustrated in the drawings.

Ohmic contact may be made to selected ones of the circuit elements by selective metallization through windows 12 in an insulating layer 14. Typically the insulating layer 14 may comprise silicon oxide formed by conventional thermal techniques. A scribe line region of the slice separating adjacent wafers is illustrated in the region 16.

Figure 1B:
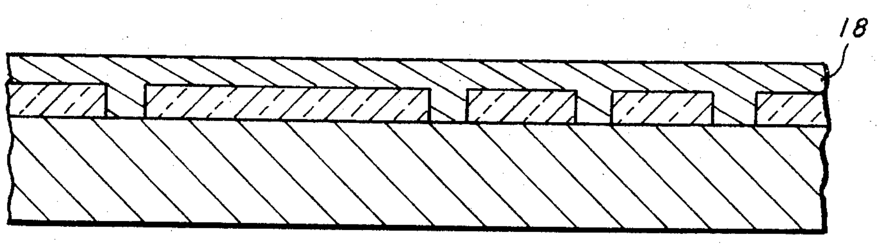

With reference to FIG. 1*b* a metal layer 18 is formed over the insulating layer 14. Preferably the metal layer 18 is aluminum and may be formed by any of various known techniques. It is preferred in accordance with the invention to deposit the aluminum by means of an electron gun evaporator. For best results the rate of deposition of the aluminum should generally be less than about 30 angstroms per second, the preferred rate being from 6 to 20 angstroms per second. A total thickness of about 40 microinches is suitable for the illustrated embodiment.

Figure 1C:
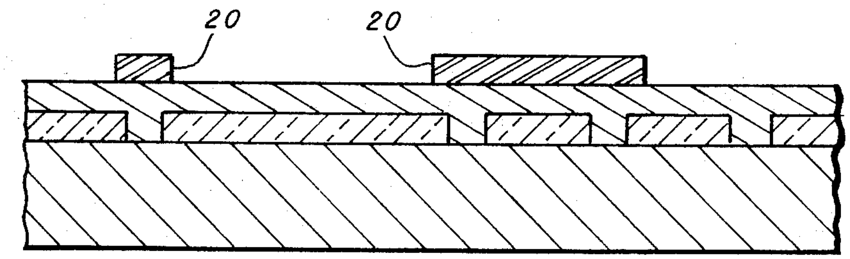
Figure 1D:
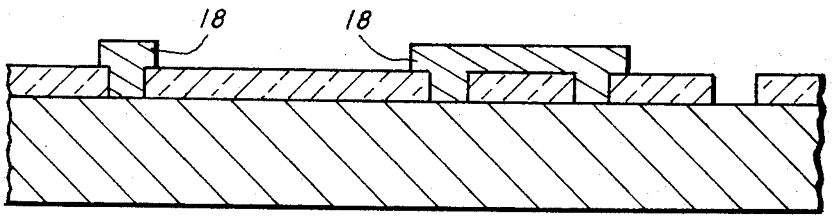

With reference to FIG. 1*c* a photoresist pattern 20 is appiled using known techniques and materials including for example, Eastman-Kodak KMER and Shipleys AZ resist. These materials are applied and patterned by photographic techniques well known in the semiconductor art. In accordance with the present invention the resist pattern may be located to cover the exact areas of metal film 18 which are to be preserved as metal contacts and electrical leads while the unexposed area are to be etched with, for example, a solution of sodium hydroxide. FIG. 1*d* illustrates the structure after selective etching of the metal film 18 and removal of the photoresist pattern 20.

Figure 1E:
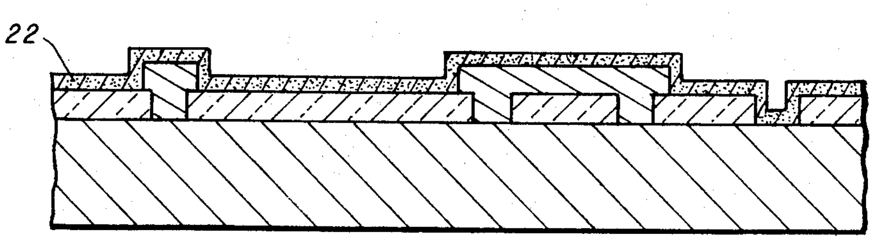

A metal layer 22 is next deposited over the patterned interconnect layer 18. In accordance with the invention this metal layer 22 is preferably aluminum deposited to a thickness on the order of 20 to 35 microinches. The slice is then immersed in a suitable electrolytic bath wherein the film 22 is electrically connected as the anode of an electrochemical cell. The application of a suitable DC voltage converts the film 22 to aluminum oxide. The structure at this stage of fabrication is illustrated in FIG. 1*e*.

A suitable electrolytic bath for use in accordance with the present invention may comprise 7.5% by weight oxalic acid dissolved in de-ionized water. A current density of 30 ma. per square inch of wafer surface can be achieved by imposing a potential difference of 30 volts DC between the wafers and a suitable cathode also immersed in the oxalic acid bath. An oxide growth rate of 2 to 3 microinches per minute is observed under these conditions. It is particularly significant that the anodization step proceeds smoothly and uniformly to completion.

Figure 1F:
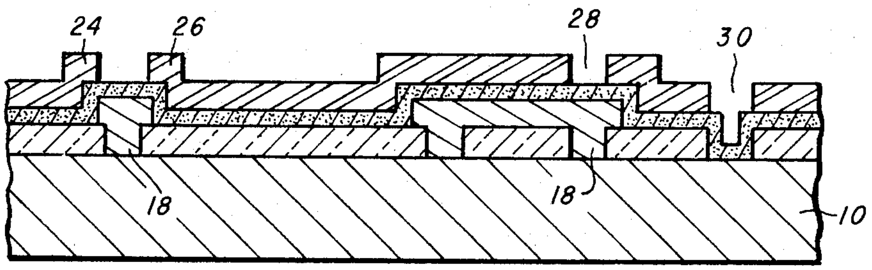
Figure 1G:
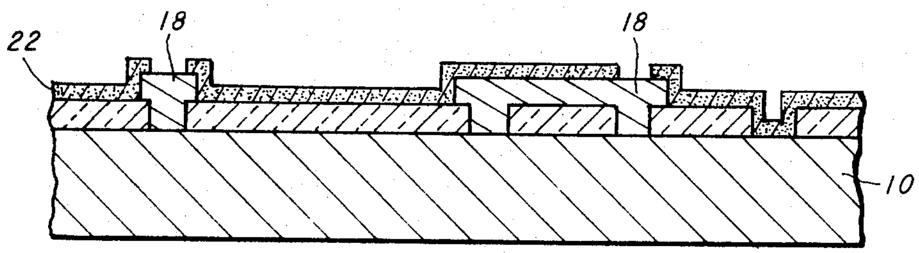

With reference to FIG. 1*f* the electrolytically converted layer 22 is masked by a layer 24 of photoresist to expose regions where external contact to the metallization layer 18 is required. These exposed regions are shown generally by the apertures 26 and 28. It will be noted that an aperture 30 is also formed over the scribe line areas which separate the wafers from one another on the slice 10. A positive-working photoresist for the layer 24 may be used. By way of example, Shepley's AZ 1350H resist spun at 7,000 r.p.m. and exposed for 45 seconds may be utilized. The exposure time may be cut to on the order of about 6 seconds if 33 seconds KPFR and reversed photomasks are used.

In the next step the exposed regions of the converted layer 22 are etched with a suitable etchant to expose the contact regions of the first level metallization 18 and the scribe line area of the slice 10. A suitable etchant is a solution of 35 mil $H_3PO_4$, 20g $CrO_3$ and 1,000 ml. water at 70% centigrade. With this solution a one minute exposure is sufficient to remove about 30 microinches of anodic aluminum oxide. As a final step, the slice is cleaned of photoresist.

Figure 2A:
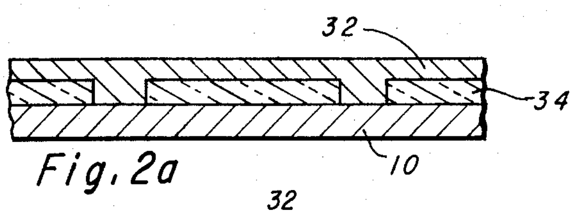
Figure 2B:
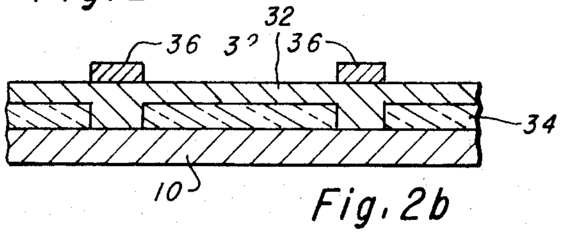
Figure 2C:
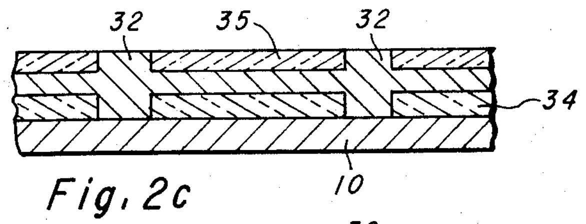

With references to FIGS. 2*a* through 2*g* there is illustrated a sequence of steps for forming a multilevel metallization system having a protective anodic oxide layer on the surface to protect it from mechanical abrasion. With reference to FIG. 2*a* a semiconductor substrate 10 may for example, comprise monocrystalline silicon. A metal film 32 extends through apertures in an insulating layer 34 to ohmically contact selected regions of the substrate 10. With reference to FIG. 2*b* a photoresist pattern 36 is formed to protect the areas of the metal layer 32 which are to be preserved as "feed through" conductors in the multilevel structure. The substrate is then placed in a suitable electrolytic bath for selective anodization whereby the composite film structure of FIG. 2*c* is produced, including the anodized layer 35. The substrate or wafer is removed from the anodization bath and is provided with a second photoresist layer 36 (reference FIG. 2*d*) patterned to protect a portion of the metal layer 32 during subsequent anodization. The wafer is returned to the anodization bath where the remaining thickness of the metal film 32 is converted to the oxide except where protected by the photoresist pattern 36. The result is an "inlaid" and over-coated metallization pattern of contacts and electrical leads including "feed through" elements exposed at the surface of the anodized layer 35 .For example, with reference to FIG. 2*e* "feed through" element 32*a* is exposed at the surface of the anodized layer 35 while "feed through" element 32*b* is completely protected by the last formed anodic layer.

Figures 2D, 2E:
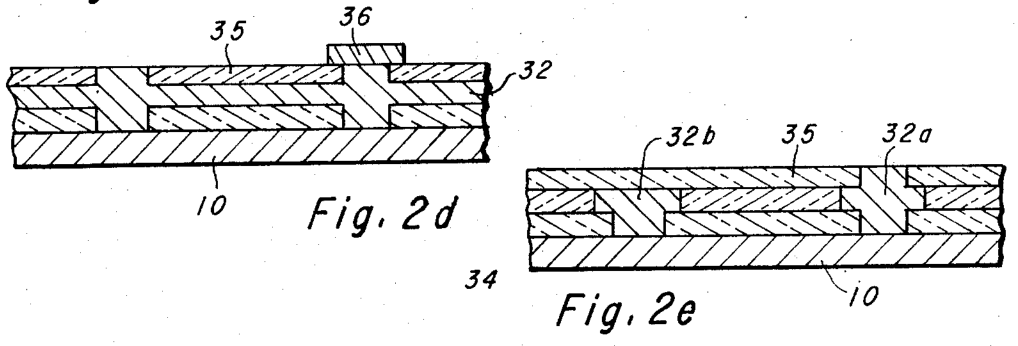
Figure 2F:
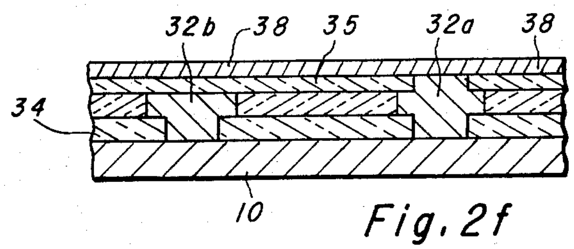
Figure 2G:
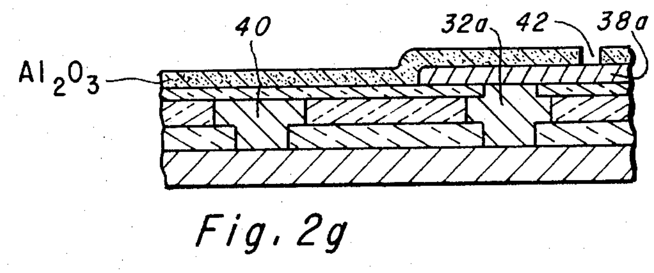

In the next step a layer of metal 38 is formed over the composite illustrated in FIG. 2*e*. Preferably the metal layer 38 is aluminum. The layer 38 is patterned to provide a second level interconnect pattern, as illustrated for example, at 38*a* in FIG. 2*g*. Next a layer 40 of metal is formed over the structure including the second level interconnect pattern 38*a*. Preferably the layer 40 comprises aluminum deposited to a thickness on the order of from 20 to 35 microinches. The structure is again immersed in a suitable electrolytic bath and the layer 40 is oxidized to completion, forming a protective overlay over the second level metallization 38*a*. The oxidized layer 40 may be masked to expose a region 42 of the oxide overlying an area of the second level metallization 38*a* to which external contact is desired to be made. The exposed region 42 is then etched with a suitable etchant such as an aqueous solution of chromic and phosphoric acids previously described.

Figure 3:
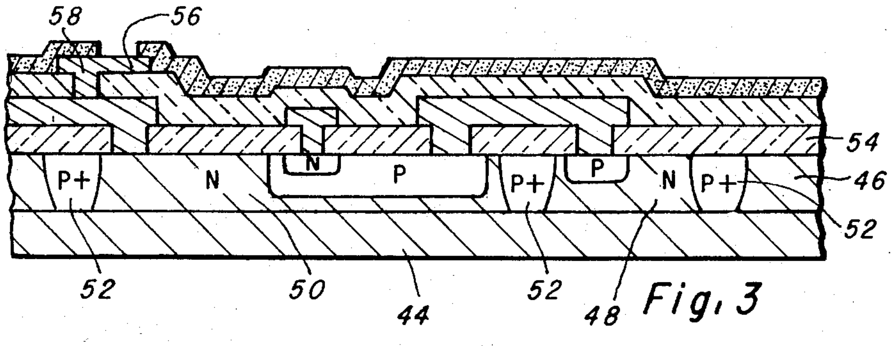
FIG. 3 is a cross section of an integrated semiconductor network having two levels of metallization wherein the exposed layer is protected by a passivating layer.

With reference to FIG. 3 there is illustrated in cross sectional view a portion of an integrated circuit which utilizes multilevel interconnects such as describe with reference to FIG. 2*a* through 2g. With reference to FIG. 3 it may be seen that the semiconductor structure includes a P type substrate 44 having an N type epitaxial layer 46 thereon. Regions 48 and 50 of the epitaxial layer 46 are electrically isolated by means of P+ regions 52. The illustrated portion of the circuit includes a diffused resistor in the region 48, a transistor in the region 50, and a metallization pattern which establishes ohmic contact between the transistor and the resistor through windows or apertures in the oxide layer 54. As illustrated, the base of the transistor is ohmically connected to the resistor.

A second level metallization 56 ohmically contacts the collector of the transistor in region 50 by a metal feed through region 58. It may be seen that the metal feed through region 58 corresponds to the region 32*a* illustrated in FIG. 2g and may be formed by similar techniques.

Figure 4:
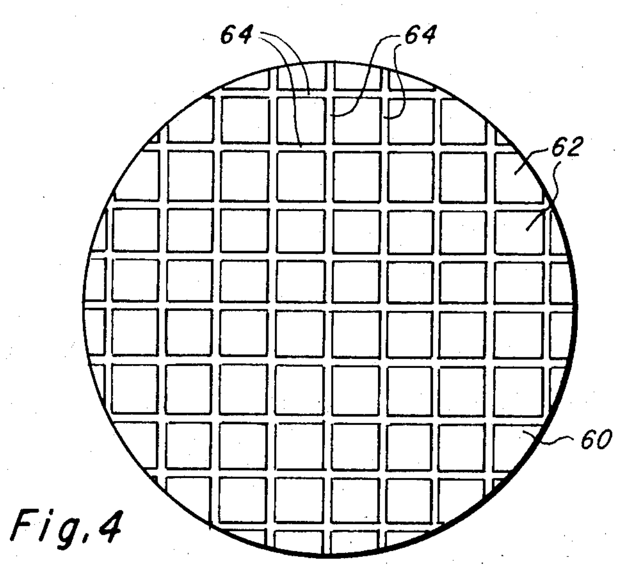
FIG. 4 is a plan view of a semiconductor slice illustrating scribe lines separating respective wafers.
Figure 5:
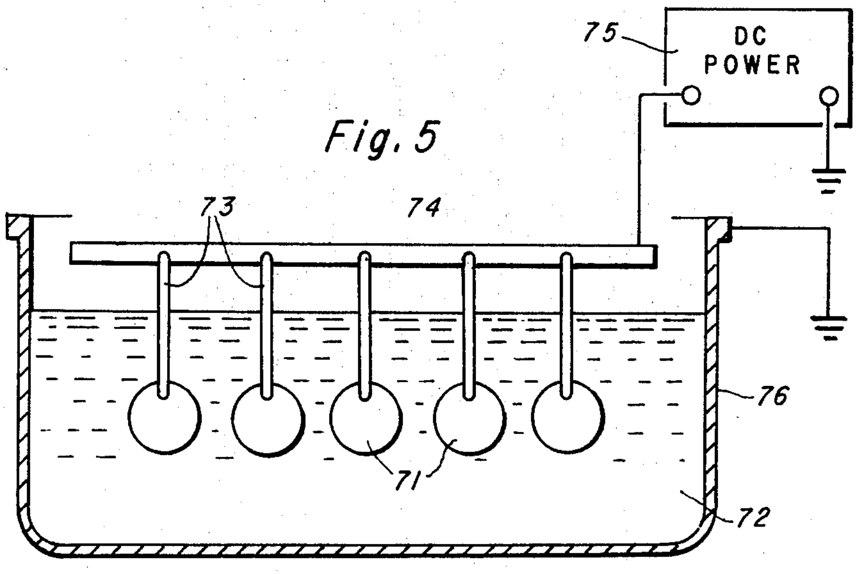
FIG. 5 is a schematic cross sectional view of selective anodic oxidation apparatus which may be used in practicing the invention.

With reference to FIG. 4 there is illustrated in plan view a slice 60 of semiconductor material such as silicon. The slice includes a plurality of wafers 62 each respectively including an integrated circuit. The wafers 62 are separated by scribe lines 64.

In FIG. 8 a suitable system of apparatus is illustrated for use in the anodization steps of the present invention. Semiconductor wafers 71 are suspended within an electrolyte 72 by means of clamps 73 mounted on a bar 74 which is connected to the positive terminal of a DC power supply 75. The tank 76 may serve as the cathode as illustrated or a separate cathode may be provided. Suitable examples of an electrolyte solution include sulfuric acid, tataric acid, and oxalic acid. A wide range of electrolyte concentrations is useful as can readily be determined by reference to known processes for anodization. Potential differences from about 20 to 200 volts DC have been used to produce current densities ranging from about 4 to 40 milliamps per square centimeter of aluminum film. Preferred concentrations are from 1 to 15% by weight.

With reference to FIG. 6*a* through 6*h* there is illustrated a sequence of steps for forming a multilevel metallization interconnect system wherein the inter-level capacitance is minimized. With reference to FIG. 6*a* a semiconductor substrate 80 is illustrated; a plurality of circuit components are formed by selective doping in the surface thereof. These components are not illustrated for clarity of description. An insulating layer 82 of for example, silicon oxide is formed on the surface of the substrate 80 which typically is a slice of monocrystalline silicon. Apertures 84 are opened in the insulating layer 82 to expose selected regions of the surface of the slice 80. An aperture 86 is also opened to expose the scribe line region separating the various wafers which are defined on the slice of semiconductor material 80. A layer 88 of metal, preferably aluminum is then formed over the surface of the slice 80 and insulating layer 82. The metal 88 extends through the apertures 84 into ohmic contact with the semiconductor slice 80. As illustrated in FIGS. 6*b* and 6*d* the layer 88 of metal is patterned by a suitable photoresist 88 and etched to produce a first level metallization pattern illustrated in FIG. 6*b* as 88*a* and 88*b*. During the etching step to pattern the metal layer 88, the scribe line region defined by the aperture 86 is also cleared of metal 88. With reference to FIG. 6*e* a photoresist pattern 92 is formed to overlie the metal region 88*a* and the portion of the interconnect region 88*b* where an external or an expanded contact to a second level metallization is required. The photoresist pattern 92 is also formed over the regions where scribe lines are located. Next a relatively thin layer of metal 94 is formed over the composite illustrated in FIG. 6*e*. Preferably the layer 94 comprises aluminum formed to a thickness on the order of 20 to 35 microinches in thickness. The structure is then placed in a suitable electrolytic bath and the layer 94 is anodized to completion, forming the composite structure illustrated in FIG. 6*f*. In the next step, insulating layer 96 is formed to overlie the electrolytically converted layer 94. The layer 96 may be formed by conventional techniques such as evaporation or sputtering. Preferably the insulating layer 96 comprises silicon dioxide. Other suitable insulating materials such as silicon nitride may be used. The deposited layer 96 is advantageous in that it is effective to reduce the inter-level capacitance of the multilevel metallization interconnect system. Preferably, the layer 96 is a better insulator than the anodized aluminum, minimizing the thickness of the layer.

In the next step the structure is heated to a temperature sufficiently high to expand and/or vaporize the resist pattern 92 which causes the overlying insulating layers 94 and 96 to "pop" open at these selected locations, thereby exposing the contact pads of the first level metallization 88*a* and 88*b*, and the scribe lines. A further layer of metal is then deposited over the structure and patterned to produce a second level metallization pattern 98. During patterning of the second level interconnect pattern 98, the metal is removed from the scribe line location 86. The structure at this point in fabrication is illustrated in FIG. 6*h*.

In some circumstances it may be desirable to form a protective coating over the second level metallization pattern 98 illustrated in FIG. 6*h*. Such a protective layer may be formed in accordance with the present invention by forming a relatively thin metal 100 of e.g., aluminum (reference FIG. 7) and electrolytically converting this layer to protective aluminum oxide. An aperture 102 may be opened to expose a region of the second level of metallization 98 where external contact is required. The aperture may be opened by masking and selective etching as previously described in accordance with the present invention or alternatively may be opened by "pop off" processing by forming a photoresist pattern over the contact area prior to forming metallization 100. This technique has also been described, for example with reference to FIG. 6*a* through 6*h*.

In forming the protective overcoat in accordance with the present invention by anodizing a relatively thin layer of, for example aluminum, the anodization must be interrupted before the underlying metal pattern is destroyed. Such a requirement however imposes no significant difficulty in accordance with the present invention since the rate of anodization is accurately reproducible and the thickness of the metal film which is being anodized is accurately known. Moreover some over anodization resulting in conversion of a portion of the underlying metal pattern to an oxide can easily be tolerated without detracting from circuit performance.

Although the invention is described with reference to aluminum as the preferred metal film, a large number of other metals can readily be anodized and are therefore within the scope of the invention, including by way of example titanium, tantalum, molybdenum, and zirconium. Further while the invention has been described with reference to detailed description of specific illustrating embodiments, it will be apparent to those skilled in the art that various modifications may be made without departing from the scope or spirit of the present invention.

What is claimed is:

1. A method for fabricating a structure having a selected metallization pattern with associated bonding pads, which metallization pattern is protected from abrasion by an anodized insulating layer comprising the steps of:

(a) forming an insulation film on one surface of a substrate;
(b) forming openings in said insulation film at locations where electrical contact is desired to subjacent material;
(c) depositing a first metal film of selected thickness on said insulation film;
(d) selectively masking said metal film to provide a mask pattern corresponding to the desired metallization pattern;
(e) etching through the unmasked area of said metal film to the underlying insulation film to thereby define said metallization pattern;
(f) depositing a second metal film having a thickness less than said selected thickness over said metallization pattern and exposed insulation film;
(g) electrolytically converting said second metal film to an insulator having small grain size;
(h) selectively masking said electrolytically converted insulator to expose regions overlying said bonding pads; and
(i) selectively etching through said insulator to expose said bonding pads, the remaining portion of said metallization pattern being protected from abrasion by said electrolytically converted metal film.

2. A method for forming a thin-film multilevel metallization pattern on a substrate comprising the steps of:

(a) forming an insulation film on said substrate;
(b) opening windows in said insulation film at locations where ohmic contact with said substrate is desired;
(c) depositing a first metal film selected thickness on the resulting composite;
(d) forming a first selective masking pattern on said first metal film at locations where surface contacts to said metal film are desired;
(e) electrolytically oxidizing a portion of the thickness of the unmasked area of said metal film;
(f) forming a second selective masking pattern on the resulting partially oxidized first metal film, said pattern corresponding to the desired geometry of said metal film;
(g) electrolytically oxidizing the remaining thickness of the unmasked areas of said first metal film;
(h) depositing a second metal film on the composite surface;
(i) masking said second metal film and etching it to form a second metallization pattern having predetermined contact areas;
(j) depositing a third metal film over the resulting composite to a thickness less than said selected thickness;
(k) electrolytically oxidizing said third metal film to an insulator having a small grain size.

3. A method for forming a thin film multilevel metallization pattern on a substrate as set forth in claim 2 wherein said first, second, and third metal layers are aluminum and said first insulation layer is silicon dioxide.

4. A method for forming a thin film multilevel metallization pattern on a substrate as set forth in claim 3 wherein the step of etching said electrolytically converted third metal film comprises immersing the structure in a solution of 35 mil $H_3PO_4$, 20 g. $CrO_3$ and 1,000 ml. at 70% centigrade.

5. In a process for fabricating a multilevel interconnected semiconductor integrated circuit wherein a first level conductive interconnect pattern extends through apertures in a first insulating layer to ohmically contact selected regions of a surface of a semiconductor substrate, the improvement for forming a second level interconnect pattern selectively contacting bonding pads defined by said first level of interconnect, comprising the steps of:

(a) masking said bonding pads with an organic polymer;
(b) depositing a first conductive film on the resulting composite;
(c) electrolytically converting said first conductive film to an insulator;
(d) depositing an insulating layer over said electrolytically converted layer;
(e) heating the resulting composite to a temperature sufficient to expand said organic polymer to pop via openings through the overlying deposited insulating layer and electrolytically converted layer, thereby exposing said bonding pads;
(f) depositing a second conductive layer over said composite, extending through said via openings and ohmically contacting said bonding pads; and
(g) etching said second layer to define a predetermined second level interconnect pattern, said deposited insulating layer protecting said electrolytically converted layer from the corrosive action of the etchant.

6. A method for fabricating a multilevel semiconductor integrated circuit comprising the steps of:

(a) forming a plurality of spaced semiconductive regions extending from one surface of a semiconductor substrate;
(b) forming a first insulator layer over said one surface defining a plurality of apertures selectively exposing said spaced regions;
(c) depositing a first conductive layer over said first insulator, extending through said apertures ohmically contacting said regions;
(d) patterning said first conductive layer to define a predetermined conductive interconnect pattern having expanded contact regions at locations where connection to a second level interconnect is required;
(e) masking said expanded contact regions with an organic polymer;
(f) depositing a second conductive film on the resulting composite;
(g) electrolytically converting said second conductive film to an insulator;
(h) depositing a layer of silicon oxide over said electrolytically converted layer;
(i) heating the resulting composite to a temperature sufficient to expand said organic polymer to pop via openings through the overlying silicon oxide and electrolytically converted layers, thereby exposing said expanded contacts;
(j) depositing a third conductive layer over said composite, extending through said via openings and ohmically contacting said expanded contacts; and
(k) etching said third layer to define a predetermined second level interconnect pattern, said silicon oxide protecting said electrolytically converted layer from the corrosive action of the etchant.

7. A method for fabricating a multilevel semiconductor integrated circuit as set forth in claim 6 wherein said second conductive film comprises aluminum.

8. A method for fabricating a plurality of discrete semiconductor integrated circuits on a semiconductor substrate comprising the steps of:

(a) forming a plurality of circuit elements extending extending from one surface of said substrate, respectively corresponding to said plurality of integrated circuits;

(b) depositing a first insulating layer over said one surface defining a plurality of apertures selectively exposing said circuit elements and the scribe lines separating said plurality of integrated circuits;

(c) depositing a first conductive layer over said first insulating layer extending through said apertures and ohmically contacting said circuit elements and scribe lines;

(d) patterning said first conductive layer to define a predetermined conductive interconnect pattern having expanded contact regions at locations where connection to a second level interconnect is required, said patterning effective to remove said conductive layer in scribe line areas;

(e) masking said expanded contact regions and scribe lines with an organic polymer;

(f) depositing a second conductive layer on the resulting composite;

(g) electrolytically converting said second conductive layer to an insulator;

(h) depositing a second layer of insulating material over said electrolytically converted layer;

(i) heating said resulting composite to a temperature sufficient to expand said organic polymer to pop via openings through the overlying deposited insulating layer and electrolytically converted layers, thereby exposing said expanded contacts and scribe lines;

(j) depositing a third conductive layer over said composite, extending through said via openings and ohmically contacting said expanded contacts;

(k) etching said third layer to define a predetermined second level interconnect pattern having bonding pads for external connection, said deposited insulating layer protecting said electrolytically converted layer from the corrosive action of the etchant; and (l) separating said plurality of integrated circuits along said scribe lines.

9. A method for fabricating a plurality of discrete semiconductor integrated circuits as set forth in claim 8 wherein said second conductive film comprises aluminum and said deposited insulating layer comprises silicon oxide.

10. A method for fabricating a plurality of discrete semiconductor integrated circuits as set forth in claim 9 further including the steps, prior to separating said integrated circuits of:

(a) depositng a conductive film over said second level interconnect pattern;

(b) electrolytically converting said film to an abrasive-resistant insulator; and (c) selectively etching said insulator to expose said bonding pads and scribe lines.

11. A method as set forth in claim 9 further including the steps, prior to separating said integrated circuits, of:

(a) masking said scribe lines and bonding pads with an organic polymer;

(b) depositing a conductive film over said bonding pads and scribe line areas;

(c) electrolytically converting said film to an abrasive-resistant insulator; and (d) heating the resulting composite to a temperature sufficient to expand said organic polymer to pop via openings through the overlying electrolytically converted layer thereby exposing said bonding pads and scribe lines.

12. A method for simultaneously fabricating a plurality of discrete integrated circuits on a semiconductor slice comprising the steps of:

(a) forming a plurality of spaced semiconductive regions of selected conductivity type and impurity concentration extending from one surface of said semiconductor slice, corresponding to the circuit elements of respective ones of said plurality of integrated circuits;

(b) forming an insulating layer over said one surface defining apertures selectively exposing said spaced regions and scribe line areas separating discrete wafers of said slice;

(c) depositing a metal layer over the resulting composite;

(d) patterning said metal layer to define a desired interconnect pattern for each wafer, having bonding pads for external connection and to expose said scribe line areas;

(e) masking said bonding pads and scribe line areas with an organic polymer;

(f) depositing a thin film of metal over the resulting composite;

(g) electrolytically converting said thin film to an abrasive-resistant insulator;

(h) heating the resulting structure to a temperature sufficient to expand said polymer to pop openings through the overlying electrolytically converted film, thereby exposing said scribe line areas and bonding pads; and (i) separating said wafers along said exposed scribe line areas.

References Cited

UNITED STATES PATENTS

| | | | |
|---|---|---|---|
| 3,460,003 | 8/1969 | Hampikian | 117—212 |
| 3,634,203 | 1/1972 | McMahon | 317—234 R |
| 3,345,210 | 10/1967 | Wilson | 117—212 |
| 3,351,825 | 11/1967 | Vidas | 317—234 |
| 3,461,347 | 8/1969 | Lemelson | 317—101 |

JOHN H. MACK, Primary Examiner

T. TUFARIELLO, Assistant Examiner

U.S. Cl. X.R.

317—243 R

UNITED STATES PATENT OFFICE
CERTIFICATE OF CORRECTION

Patent No. 3,798,135 Dated March 19, 1974

Inventor(s) Ronald C. Bracken, James G. Harper, Arnold D. Paddock, and Wilson G. Morrison It is certified that error appears in the above-identified patent and that said Letters Patent are hereby corrected as shown below:

Column 6, line 47 change "Shepley's" to read --Shipley's--; line 56 change "mil" to --ml--; line 57 change "70 % centigrade" to --70° Centigrade". Column 10 line 4 change the "." to a --;-- ; between lines 4 and 5 insert the following:

--(1) masking said electrolytically oxidized film to expose areas overlying said contact areas; and (m) etching said exposed areas to expose said contacts. -- line 13 change "mil" to --ml--; line 14 change "70 % centigrade" to --70° Centigrade--

Signed and sealed this 22nd day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.